United States Patent [19]

Rogers et al.

[11] 4,318,201
[45] Mar. 9, 1982

[54] WINDSHIELD WIPER ARM

[75] Inventors: Gerald L. Rogers; Ronald B. Schulte, both of St. Louis, Mo.

[73] Assignee: Emerson Electric Co., St. Louis, Mo.

[21] Appl. No.: 136,434

[22] Filed: Apr. 2, 1980

[51] Int. Cl.³ ............................................... B60S 1/34
[52] U.S. Cl. ................................. 15/250.35; 15/250.2
[58] Field of Search ............. 15/250.2, 250.35–250.42

[56] References Cited

U.S. PATENT DOCUMENTS

| | | | |
|---|---|---|---|
| 2,613,385 | 10/1952 | Wylie | 15/250.35 X |
| 3,387,316 | 6/1968 | Pearse | 15/250.35 X |
| 3,480,985 | 12/1969 | Forster | 15/250.35 |
| 3,480,986 | 12/1969 | Forster | 15/250.36 |

*Primary Examiner*—Peter Feldman

*Attorney, Agent, or Firm*—Polster, Polster and Lucchesi

[57] ABSTRACT

An aircraft windshield wiper arm assembly adapted particularly for use with curved windshields, the wiper arm assembly having a hub mountable on an oscillatory wiper drive post and an elongate wiper arm cantilevered from the hub with a wiper blade carried on the free end of the arm. The arm is so shaped that its moment of inertia decreases progressively from its fixed to its free end and the arm is preferably formed so as to assume a curved, unflexed position. An adjustment is provided for flexing the arm from its unflexed, curved position to a substantially flat position so that with the wiper blade bearing on the windshield, the arm exerts a desired force on the wiper blade as the windshield wiper arm assembly is swept over a curved windshield.

5 Claims, 12 Drawing Figures

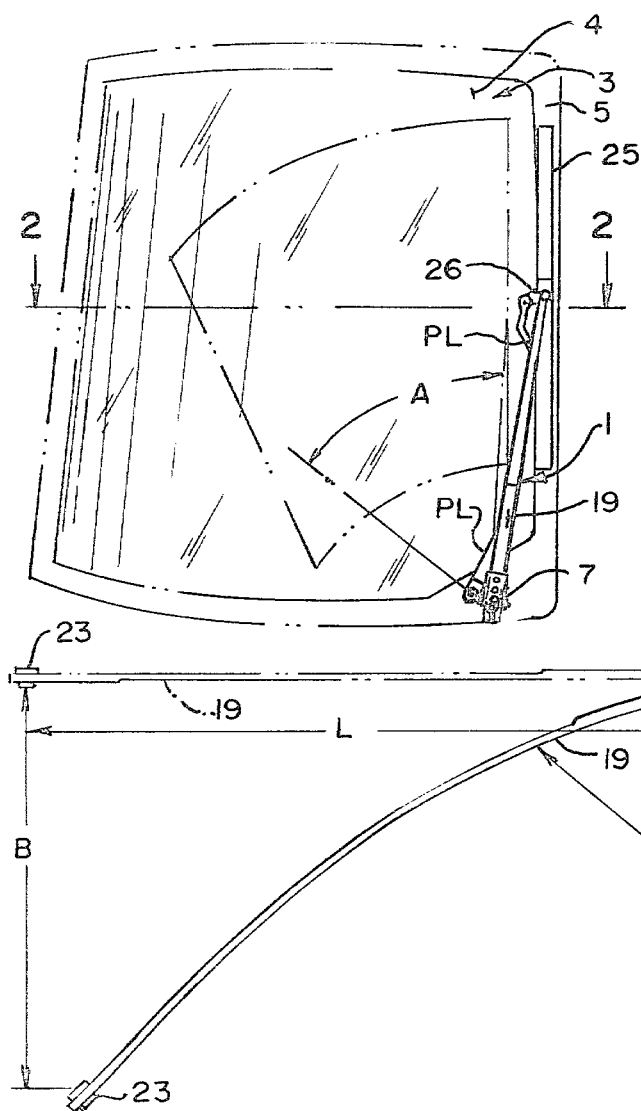
FIG. 1.
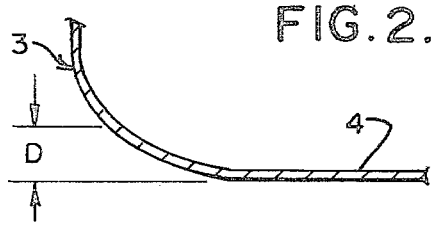
FIG. 2.
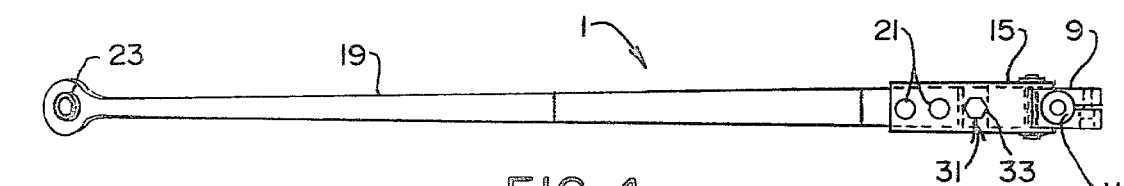
FIG. 3.
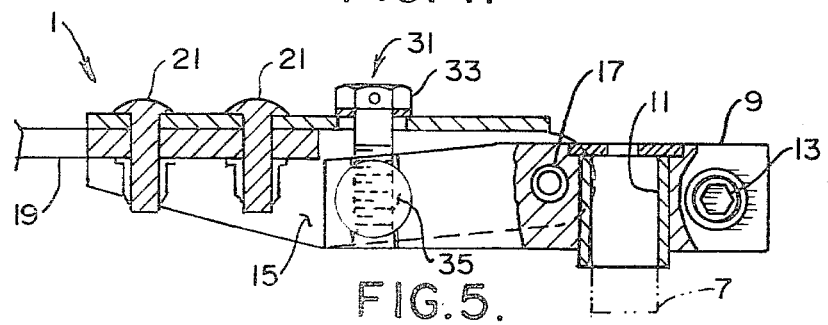
FIG. 4.
FIG. 5.

WINDSHIELD WIPER ARM

BACKGROUND OF THE INVENTION

This invention relates to windshield wipers, and more particularly to an improved aircraft windshield wiper arm assembly particularly well suited for use with curved aircraft windshields.

Larger aircraft (both rotary and fixed wing) in commercial, general, and military aviation are required to have external windshield wipers for aiding visibility of the flight crew by clearing rain, snow, condensation, etc., from the outer surface of the aircraft's windshield. Typically, aircraft windshield wiper systems include a motor or drive for oscillating one or more wiper arms through an arc across the outer surface of the windshield. Typically, an elastomeric wiper blade is carried by the wiper arm in such manner that the arm applies a relatively linear force along the length of the wiper blade so that the latter uniformly scrapes moisture and dirt from the outer surface of the windshield with a squeegee-like action.

In aircraft windshield wiper applications, it is necessary that the wiper arm and blade be resiliently held in its parked position with the elastomeric blade bearing on the windshield while the aircraft is flown through its entire flight envelope. This includes the requirement of holding the blade down on the windshield even at extremely high air speeds when the windshield wiper would not normally be operated. Of course, the wiper blade must be resiliently held in contact with the outer surface of the windshield as it operates under various flight conditions. As the wiper operates, the wiper arm and the blade present themselves differently to the air stream at different positions of the operational cycle of the wiper, and thus encounter a variety of aerodynamic forces tending possibly to lift the blade from the windshield at one point of its operational cycle and possibly, at another point of its operational cycle, to force the windshield blade against the windshield. Typically, the wiper arm is spring loaded so as to resiliently bias the blade against the windshield with sufficient force so as to firmly maintain the blade in engagement with the windshield under all operating conditions.

On certain aircraft, such as many commercial jet liners, the windshield panels are flat. Thus, with a given resilient preload or spring force on the wiper arm, the biasing force exerted on the wiper blade by the arm as the wiper moves across the windshield remains relatively constant.

However, on other aircraft with curved windshields, the wiper arm must deflect so as to permit the blade to follow the curved contour of the windshield as the wiper arm sweeps across the windshield. This flexing of the wiper arm has two adverse effects. First, as the wiper arm oscillates (sweeps) across the curved windshield, it moves toward and away from its attachment point to the aircraft so that the biasing force applied to the blade changes markedly. In order to ensure that an adequate biasing force is maintained on the blade even when the wiper arm is in its most deflected position, the wiper arm is often initially biased to a very high level so as to compensate for biasing force drop off. Secondly, as the wiper arm oscillates, the alternating changes in the biasing force on the wiper arm coupled with the higher initial biasing force has resulted in fatigue failures of many of the prior art wiper arms and/or preload adjustment mechanisms used on curved windshields. In certain aircraft applications, preventive maintenance requires wiper arms to be changed as often as every fifty hours of flight time. Not only does this relatively short replacement life constitute undue expense, but an unexpected failure of a wiper blade assembly could, under certain flight conditions, impair the flight crew's vision and thus place an extra burden on the flight crew in adverse weather conditions.

Among the several objects and features of the present invention, may be noted the provision of a wiper arm particularly well suited for use on a curved windshield which maintains an acceptable biasing or preload force on the wiper blade as the blade oscillates or sweeps across the curved windshield;

The provision of such a wiper arm which has markedly improved service life and thus will have markedly lower maintenance costs;

The provision of such a wiper arm which may be retrofitted on existing aircraft without modification to the aircraft or to the wiper drive system;

The provision of such a wiper arm in which the biasing force on the arm may be readily adjusted to a predetermined level; and The provision of such a wiper arm which is of light weight and economical construction.

Other objects and features will be in part apparent and in part pointed out hereinafter.

SUMMARY OF THE INVENTION

Briefly stated, a windshield wiper arm assembly of the present invention for use on a windshield having a curved outer surface comprises a hub adapted to be secured to a drive for oscillating or sweeping the windshield wiper assembly across the curved windshield surface. The windshield wiper assembly further includes an elongate, resiliently flexible arm secured to the hub for pivoting relative to the hub about an axis transverse to the longitudinal length of the arm, and a wiper blade carried by the free end of the arm. The arm has an initial unflexed position in which the arm is curved with its radius of curvature ranging between about one half and one and a half times the length of the arm. The arm further has a flexed position in which the arm is substatially flat with the free end of the arm exerting a desired resilient biasing force on the wiper blade for operatively holding the blade against the curved outer surface of the windshield as the wiper assembly is oscillated.

BRIEF DESCRIPTION OF THE DRAWINGS

FIG. 1 is a front elevational view of a typical aircraft windshield having a curved outer surface with a windshield wiper assembly of the present invention mounted on the windshield with the wiper assembly stowed in its parked position, and further illustrating an arc through which the wiper arm assembly is oscillated or swept upon operation of a windshield wiper drive system;

FIG. 2 is a horizontal cross sectional view of the windshield taken along line 2—2 of FIG. 1 illustrating the curvature of the outer surface of the windshield;

FIG. 3 is a side elevational view of the windshield wiper assembly of the present invention with portions thereof cut away for purposes of illustration, the windshield wiper assembly including a cantilever wiper arm shown in solid lines in its curved, unflexed position and shown in phantom in its substantially flat, flexed position;

FIG. 4 is a top plan view of a portion of the wiper arm assembly shown in FIG. 3;

FIG. 5 is an enlarged side elevational view of a portion of the wiper arm taken on line 5—5 of FIG. 3 with portions shown in cross section;

Corresponding reference characters indicate corresponding parts throughout the several views of the drawings.

DESCRIPTION OF PREFERRED EMBODIMENTS

Figure 6:
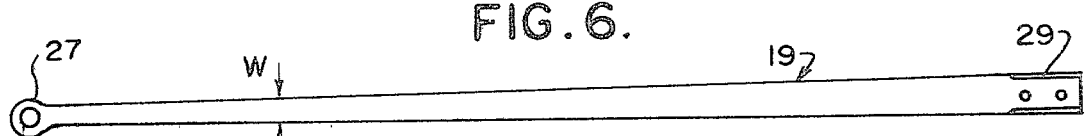
FIG. 6 is a plan elevational view of the cantilevered wiper arm prior to its being formed to assume its curved, unflexed positon.

Referring now to the drawings, a first embodiment of the windshield wiper assembly of the present invention is illustrated in FIGS. 1–7 and is generally indicated by reference character 1. In FIG. 1, a windshield assembly of a typical aircraft is generally indicated at 3. The windshield is comprised of a transparent windshield 4 made of glass or a suitable transparent synthetic resin material, and is secured in place to the aircraft fuselage by means of a windshield frame 5. As depicted in FIGS. 1 and 2, windshield 4 has a curved outer surface that generally follows a desired contour of the aircraft fuselage. In FIG. 2, the curvature of the windshield from a plane tangent to the front face of the windshield is indicated by dimension D.

As shown in FIG. 1, wiper assembly 1 is secured to a drive post or shaft 7 of a conventional wiper drive assembly 8 installed within the aircraft. Wiper assembly 1 is shown in its parked position in which it extends generally vertically along the centerline of the windshield frame 5 from drive post 7 and is disposed in a plane generally perpendicular to the rotational axis of drive post 7. Upon operation of the wiper drive system (not shown), drive post 7 and hence wiper assembly 1 is oscillated (i.e., swept back and forth) through an arc, as indicated by the angle A in FIG. 1, so that the wiper assembly sweeps a large portion of windshield 3. As the wiper assembly sweeps over the curved windshield, the outer end of the wiper arm assembly deflects or moves in axial direction with respect to the rotational axis of drive post 7 as the wiper arm assembly follows the curved outer surface of windshield 3 so that the wiper assembly remains in operative contact with the curved windshield. As indicated above, this deflection of the wiper arm assembly is indicated by dimension D in FIG. 2 and, of course, this deflection will vary depending upon the curvature of the windshield and the angular position of the wiper blade as it sweeps back and forth across the windshield.

Referring now to FIGS. 3 and 5, wiper assembly 1 is shown to comprise a hub 9 adapted to be fixedly secured to drive post 7. A hole 11 is provided in hub 9 for reception of the drive post and a hub clamp bolt 13 is provided in the hub for securely clamping the hub to the drive post. As is conventional, the outer surface of the drive post and the inner surface of hole 11 may be serrated or splined so that upon clamping the hub on the drive post, the hub and the drive post become mechanically interlocked.

A channel-shaped fitting 15 is pivotally connected to hub 9 by means of a pivot pin 17 for pivotal movement of the fitting about an axis transverse to the length of the wiper arm assembly 1. An elongate wiper arm 19 is cantilevered from fitting 15 by means of fasteners 21. As shown in FIGS. 4 and 6, arm 19 is a one-piece member having a constant taper along its length with its narrowest width at its free end and with its widest width adjacent fitting 15. Further, the thickness of arm 19 varies along its length. Thus, the moment of inertia (or the section modulus) of arm 19 progressively changes along its length with its highest moment of inertia being at its end adjacent fitting 15 so as to result in relatively constant loading (i.e., stress level) along a substantial portion of the effective length L of the arm. As shown in FIG. 4, the outer end of arm 19 is enlarged and carries a bushing 23. A wiper blade assembly 25 (shown in phantom in FIG. 1) is carried by means of a shoulder bolt 26 received in bushing 23. Wiper blade assembly 25 is conventional and has an elastomeric wiper blade (not shown) and a whiffletree arrangement (also not not shown) for connecting the elastomeric blade to arm 19 and for substantially uniformly distributing the biasing force of wiper arm assembly 1 on the blade so that a generally linear force is applied along the entire length of the blade as it bears on the windshield. A planograph link PL is pin connected between hub 9 and the free end of arm 19 so as to maintain blade 25 in a desired orientation as the blade is oscillated.

Figure 7:
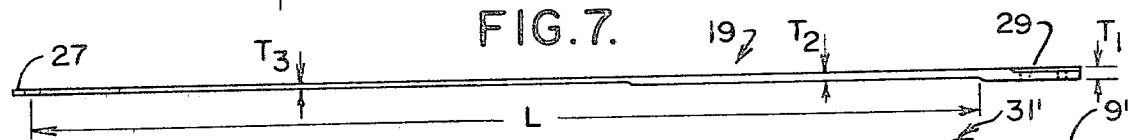
FIG. 7 is a side elevational view of the wiper arm illustrated in FIG. 6.

Arm 19 is shown in FIGS. 1–7 to be a tapered arm of a stiff, resilient, homogeneous material, such as a suitable heat treated stainless steel or the like. In FIGS. 4 and 6, arm 19 is shown preferably to have a contant taper along its length. As shown in FIGS. 6 and 7, arm 19 has a free end 27 and a fixed end 29. In one particular design, as illustrated, the arm has an overall length of about 21.50 inches (54.6 cm.), and an effective length L (i.e., from the end of fitting 15 to the center of bushing 23) of about 20.0 inches (50.8 cm.).

In accordance with the invention, the thickness of arm 19 decreases progressively from its fixed end 29 to its free end 27. As shown in FIG. 7, the thickness of the arm decreases in three steps and the arm has three thicknesses, including a nominal thickness $T_1$ at its fixed end 29 of about 0.187 inches (4.7 mm.), an intermediate thickness $T_2$ of about 0.125 inches (3.2 mm.), and a thickness $T_3$ at its outer end 27 of about 0.095 inches (2.4 mm.). It will be appreciated that the stiffness of wiper arm 19 is dependent both on the modulus of the elasticity (E) of the material from which it is fabricated and the shape (i.e., the moment of inertia I) of the arm. The modulus of elasticity of stainless steel is approximately equal to 28,000,000 psi. Since arm 19 is of rectangular cross section, its moment of inertia I about its neutral axis is given by the formula $I=(wt^3)/12$, where w and t are, respectively, the width of the arm and the thickness of the arm at the point along the arm at which the moment of inertia is to be determined. Since arm 19 is of a constant taper, it will be appreciated that the moment of inertia varies continuously along its length even though the thickness changes in steps. It will be appreciated, however, that the thickness of the arm could also vary uniformly. In accordance with this invention, the moment of inertia I of the arm increases from the free to the fixed end of the arm in proportion to the increase in bending moment from the free to the fixed end of the arm so that the arm has a relatively uniform loading (i.e., stress level) along a substantial portion of its effective length L. This results in a minimum weight for the arm and in an efficient utilization of material.

As shown in FIG. 3, after arm 19 is formed so as to have its desired thickness and taper, it is formed or bent so as to assume an unflexed, curved position (shown in solid lines in FIG. 3). After the arm has been formed to its desired unflexed, curved position, the arm is heat treated so that it will assume a stiff, resilient condition. Preferably, the curvature of arm 19 is such that its radius of curvature R (see FIG. 3) ranges between about one half and one and a half times its effective length L ($0.5\ L \leq R \leq 1.5\ L$). For example, arm 19 may have an effective length L of about 20 inches (50.8 cm.) and a radius of curvature R of about 18.75 inches (47.6 cm.). It will be understood, however, that the above dimensions are only for purposes of illustration and that other dimensions within the above-stated approximate range are satisfactory.

Wiper assembly 1 further includes means, as generally indicated at 31, for adjustably flexing arm 19 from its unflexed, curved position (as shown in solid lines in FIG. 3) to a flexed position (as shown in phantom in FIG. 3) in which the arm is substantially flat (but may be slightly bowed) and in which the outer end of the arm applies a desired resilient biasing force to blade assembly 25 thereby to hold the latter in operative engagement with windshield 3. Specifically, means 31 comprises an adjustment bolt 33 (see FIG. 5) carried by fitting 15 and a barrel nut 35 rotatably carried by a portion of hub 9 with the bolt threadably engaging the barrel nut. As shown, bolt 33 and barrel nut 35 are located outboard of pivot pin 17 interconnecting fitting 15 to hub 9. It will be appreciated that with wiper assembly 1 installed on drive post 7 and with blade assembly 25 bearing on the outer surface of windshield 3, arm 19 is flexed or bent from its unflexed, curved position and applies some initial biasing force to the blade assembly. Upon turning bolt 33 so as to draw fitting 15 toward barrel nut 35, a greater biasing or preload force is applied to the free end of arm 19 and thus to the blade assembly 25 as the arm resists being flexed toward its flat, flexed position. Thus, by adjusting bolt 33, the biasing force applied to blade assembly 25 by means of the resilient wiper arm 19 may be readily varied and controlled to assume a desired level.

It will be further appreciated that, in accordance with this invention, the initial curved, unflexed position of resilient wiper arm 19 requires that the wiper arm be flexed through a substantial distance, as indicated by dimension B in FIG. 3, so as to assume its substantially flat, flexed position. Further in accordance with this invention, arm 19 has a relatively low cantilevered spring constant K such that the free end of the wiper arm may deflect through a considerable distance D (see FIG. 2) as the windshield wiper assembly 1 is oscillated across a curved windshield 3 without such a change in the biasing or preload force exerted by the wiper arm on blade assembly 25 as would cause the wiper blade to improperly remove water etc. from the windshield. For example, with the wiper arm assembly 1 having the dimensions described above, the wiper arm assembly may exert a biasing force on wiper blade 25 of approximately 6.75 pounds (3.06 kg.) when the wiper arm assembly is in its parked position, as illustrated in FIG. 1. If, for example, the end of arm 19 deflects through a maximum distance D of approximately 3.70 inches (9.4 cm.) as the wiper blade oscillates through angle A of about 55° (see FIG. 11) across windshield 3, the resilient biasing force exerted on the wiper assembly drops off approximately 2.25 pounds (1.02 kg.), as shown in FIG. 12. Thus, the wiper arm assembly 1 of the present invention maintains approximately 67% of its initial biasing force on the wiper blade assembly. For the wiper blade assembly 1 described above, this cantilevered spring constant K may, for example, have a value of approximately 0.66 to about 1.0 pounds per inch of deflection of the free end of arm 19 from its substantially flat, flexed position.

More specifically, the center of bushing 23 moves through a distance B ranging between about 30 and 70 percent of the effective length L of arm 19. Even more specifically, as illustrated in FIG. 3, with arm 19 having an effective length L of about 20 inches (50.8 cm.), the free end of the arm is flexed through a distance B equal to about 10 inches (25.4 cm.), or about one half of length L, as the arm is flexed from its curved to its generally flat position. It will be appreciated that with arm 19 having a relatively low cantilever spring constant K and with the free end of arm 19 being flexed through a relatively long distance B, movement or deflection of the arm as it oscillates across a curved windshield do not result in wiper 25 failing to squeeze water from windshield 4.

Figure 11:
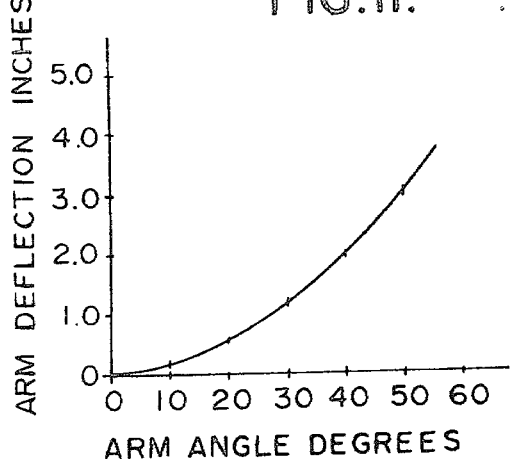
FIG. 11 is a plot of windshield wiper arm angle as it is swept across a curved windshield versus the deflection of the free end of the wiper arm from its parked position.
Figure 12:
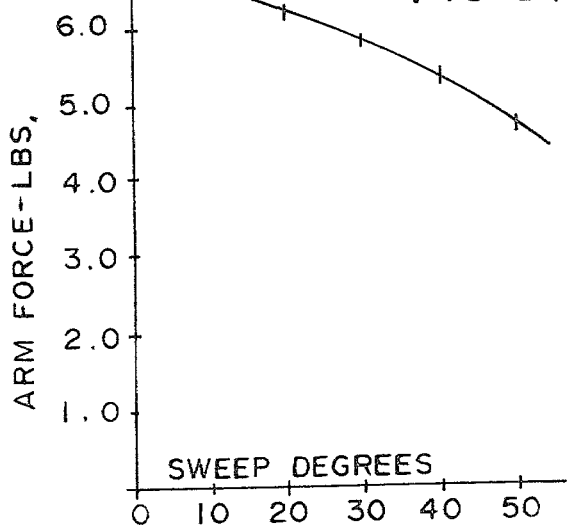
FIG. 12 is a plot of arm angle versus the biasing force exerted by the arm on its wiper blade assembly as it is swept across a curved windshield.

Referring now to FIGS. 11 and 12, the deflection of a typical windshield wiper arm assembly 1 of the present invention on a particular curved windshield is illustrated in FIG. 11 as a function of arm angle as the wiper arm assembly oscillates across the windshield. In the case illustrated in FIG. 11, it will be seen that the maximum deflection D of the wiper arm is approximately 3.7 inches at a sweep angle of about 55°. In FIG. 12, the drop off of the resilient biasing force exerted by wiper arm 19 on blade assembly 25 is depicted as a function of arm angle. In FIG. 12 it can be seen that the resilient biasing force exerted by arm 19 on the wiper blade varies as the wiper assembly sweeps across curved windshield 3, but that even at its most deflected position (i.e., at a sweep angle of about 50°), the arm still exerts about 69% of its maximum biasing force (when the arm is at the zero sweep angle position) on blade 25 which is more than sufficient to insure sweeping of rain etc. from windshield 4 and to insure that the blade remains in engagement with the windshield as the blade is oscillated and as the aircraft is flown.

Figure 8:
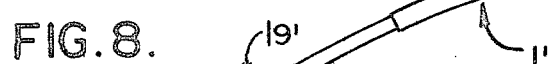
FIG. 8 is a side elevational view of another embodiment of a wiper arm of this invention of composite construction, the wiper arm being shown in its curved, unflexed position.

Referring now to FIG. 8, a second embodiment, as indicated as 1', of the windshield wiper arm assembly of this invention is depicted, wiper arm assembly 1' being shown in its curved, unflexed position. As described above in regard to wiper arm assembly 1, when arm assembly 1' is installed, it will assume a generally flat, flexed position. Generally, hub 9' and fitting 15' together with arm adjustment means 31' for this second embodiment of the wiper arm assembly is generally similar to those corresponding parts described hereabove in regard to wiper arm assembly 1. The primary difference between these two embodiments of the wiper arm assembly is in the construction of their respective arms 19 and 19'. Arm 19' is shown to be of a composite (i.e., resin and filament) construction having a decreasing moment of inertia from its cantilevered end to its free end. Specifically, the construction of arm 19' is made of reinforced plastic construction have a generally rectangular, open or closed beam cross section. For example, carbon, boron, or glass fibers may be used as the reinforcing filaments in a suitable epoxy resin matrix for the construction of arm 19'. Arm 19' is made so as to assume an initial unflexed, curved position as shown in FIG. 8 and has a cantilever spring constant K' generally similar to that described for arm 19. Thus, upon installation of wiper arm assembly 1' on the aircraft wiper drive system, arm 19' will be flexed from its initial curved position to its substantially flat, flexed position in which arm 19 applies a desired resilient biasing force on the wiper blade assembly 25 carried by the free end of the wiper arm.

Figure 9:
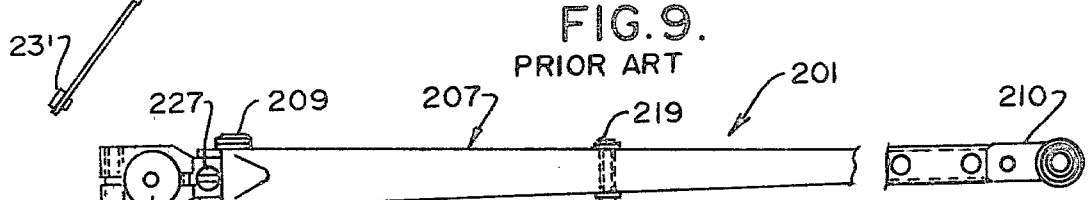
FIG. 9 is a plan view of a prior art wiper blade assembly typically used on curved aircraft windshields.
Figure 10:
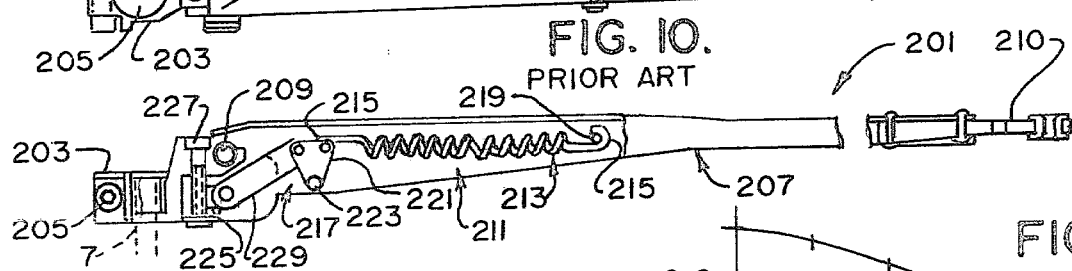
FIG. 10 is a side elevational view of the prior art wiper blade assembly illustrated in FIG. 9 with portions shown in cross-section.

Referring now to FIGS. 9 and 10, a typical prior art windshield wiper assembly, as generally indicated by reference character 201, for use on a curved windshield will now be discussed. Prior art windshield wiper arm assembly 201 is intended to be secured to a rotatable drive post 7 and to be oscillated by the wiper drive system so that the arm will sweep a desired arc across the windshield. A conventional wiper blade assembly may be attached to the free end of this prior art wiper arm. Specifically, wiper arm assembly 201 includes a hub 203 adapted to be installed on drive post 7 and to be securely clamped thereto by means of a clamp bolt 205. The assembly further has a wiper arm 207 pivotally secured to hub 203 by means of a pivot pin 209. Arm 207 is shown to be an elongate member which is fabricated to have a desired length which will vary depending upon its application. For example, the length of arm 207 may range between about 11 and 20 inches (28 and 51 cm.). A wiper blade attachment member 210 is riveted to the outer end of the arm. Arm 207 is shown to be channel-shaped in cross section and is typically formed of a relatively high strength metal alloy, such a heat treated stainless steel or the like. As can be appreciated, due to the shape and design of wiper arm 207, it is relatively stiff. For example, the stiffness or cantilever spring constant of a typical prior art arm may be about one pound/inch (1.15 kg.cm.).

As is conventional, in order for an elastomeric wiper blade to properly squeegee water from a windshield surface, a desired force must be applied to the wiper blade so as to hold it against the windshield. In typical prior aircraft windshield wiper applications, this preload force must also be sufficient to resist aerodynamic forces tending to lift the blade from the windshield. Thus, arm 207 is required to exert a resilient preload or biasing force on the wiper blade and to maintain a minimum biasing force on the blade even as the blade moves out of a plane perpendicular to drive post 7 as the blade sweeps across a curved windshield.

Wiper arm assembly 201 is provided with an adjustable spring and linkage arrangement, as generally indicated at 211, for applying the spring load on the wiper blade of sufficient magnitude to positively hold the blade on the windshield during all portions of its operational cycle. As shown in FIG. 10, this spring and linkage arrangement 211 includes a relatively stiff coil spring 213 which has hook ends 215 for attachment of the spring, and a linkage 217. The outer end of the spring is attached to a clevis pin 219 between the side flanges of arm 203. Linkage 217 includes a rock lever 221 pivoted on a rock pin 223 carried by arm 203. A tension clevis 225 (one-half of which is illustrated in FIG. 10) is adjustably secured to hub 205 by means of spring tension adjustment screw 227 and an link 229 is pinned between clevis 225 and rock lever 221. Thus, upon turning screw 227 so as to move clevis 225 downwardly, the rock lever is caused to rotate counterclockwise (as viewed in FIG. 10) about pin 223 thereby to stretch spring 213 and to increase the preload on the wiper arm. Pivot 209 and clevis pin 219 are offset slightly from one another so that spring tension exerts a couple on the wiper arm tending to force blade attachment end 201 toward the windshield with the desired blade preload force exerted on the blade assembly. For example, the blade preload force may range between about 4–7 pounds (1.8–3.2 kg.). However, because of the small offset between pivot 209 and clevis 219 and because of the relatively long length of arm 207, spring 213 must exert a relatively high force (e.g., about 100 pounds, 45 kg.) to result in the desired preload on the spring. Because of the relatively cramped space for spring 213 within arm 207, the spring must have a relatively high spring constant (e.g., 400 pounds per inch, 71 kg./cm.) and is typically made of high strength spring material, such as music wire or the like.

However, it will be noted that as the wiper assembly 201 sweeps over a curved windshield, arm 207 must pivot relative to hub 203 about pivot pin 209 so that the blade will remain in contact with the curved windshield. As the blade pivots about pin 207 in clockwise direction (as viewed in FIG. 11), it will be appreciated that the relative pivotal movement of the arm with respect to hub 203 causes spring 213 to relax, thus relieving at least some of the preload on the wiper blade. Upon reverse sweeping movement of the arm assembly, the arm 207 is forced to rotate in an opposite direction causing the tension of the spring to increase.

It has been observed that this decrease and increase in tension of spring 213 oftentimes results in fatigue failures of the spring and of the linkage and in fatigue failure of arm 203 itself. Surprisingly, wiper arm assembly 1 of this invention overcomes this problem of fatigue failure, eliminates the necessity of the complicated spring and linkage arrangement for applying a biasing force to the spring arm, and yet is readily adjustably to exert a desired resilient preload force on the wiper assembly 25.

EXAMPLE

In laboratory testing on a curved windshield, such as on a Model 222 Bell helicopter, a wiper arm 1 of the present invention, as illustrated in FIGS. 1–7 herein, was operated for over 500 hours and was found to have no signs of wear or fatigue cracks thereby indicating that the service life of the wiper arm is appreciably greater than conventional wiper arms.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A windshield wiper arm assembly for use on a windshield having a curved outer surface, said assembly comprising a hub adapted to be secured to a drive for controlling said assembly through an arc across said curved windshield surface between a first position at one side of said arc and a second position at the other side of said arc, and an elongate, resiliently flexible arm secured at one end to said hub for pivoting relative to said hub about an axis transverse to the longitudinal length of said arm, said arm having an effective length L and a wiper blade on the other or free end thereof, said free end of said arm deflecting through a predetermined distance D in axial direction relative to said hub as said wiper blade follows and curved outer surface of said windshield as said assembly is oscillated through said arc between its first and second positions, said arm being an integral, one-piece member of a relatively stiff, homogeneous, spring-like material having a constant taper in widthwise along its length with its narrowest width at its free end, the thickness of said arm decreasing from its said one end to its free end, said arm having an initial unflexed, curved position with the radius of curvature of the arm ranging between about one half and one and a half times the effective length L of said arm and a flexed position in which said free end of the arm exerts a desired resilient force on the wiper blade carried thereby for operatively holding the wiper blade against the curved outer surface of the windshield as the arm is operated, said arm having a substantially uniform stress level along a substantial portion of its effective length L when said arm is in its flexed position.

2. A windshield wiper arm assembly as set forth in claim 1 further comprising adjustable means interconnecting said arm and said hub for varying the resilient force exerted by said arm on said curved blade.

3. A windshield wiper arm assembly as set forth in claim 2 wherein said adjustment means comprises threaded fastener means between said arm and said hub.

4. A windshield wiper arm assembly as set forth in claim 1 wherein said drive includes an oscillatable shaft, and wherein as said assembly oscillates across said outer curved windshield surface, the free end of said arm deflects toward and away from a plane perpendicular to the longitudinal axis of said shaft, and wherein said arm has a cantilever spring constant such that the resilient force applied to the wiper blade by said wiper arm assembly remains within about 40% of said desired resilient force as said arm is oscillated across said curved windshield.

5. A windshield wiper arm assembly comprising a hub adapted to be fixedly secured to a oscillatible drive for oscillating said wiper arm assembly across a curved windshield, a fitting pivotally secured to said hub for pivoting movement about an axis transverse to the length of said arm assembly, and an elongate, resiliently flexible arm cantilevered from said fitting, the free end of said arm being adapted to have a wiper blade secured thereto, said arm being a unitary member of homogeneous, stiff, spring-like material decreasing in thickness from its end adjacent said hub to its free end and tapering along its length with its widest dimension adjacent said hub, said arm having an initial unflexed, curved position and a flexed position in which said arm exerts a desired biasing force on the above-mentioned wiper blade bearing on the outer surface of said windshield, adjustable means interconnecting said fitting and said hub for flexing said arm from its unflexed, curved position to its flexed position through a distance ranging between about 30% and 70% of its length, said arm having a relatively low cantilever spring constant so that upon the wiper arm assembly being oscillated across said curved windshield, said flexible arm resiliently flexes between its flexed position and its unflexed position through a maximum distance ranging up to about 18.5% of the length of said arm and yet maintaining the biasing force on the wiper blade to be within about 69% of said desired biasing force exerted by said arm on said wiper blade when said arm is in its flexed position.

* * * * *

UNITED STATES PATENT AND TRADEMARK OFFICE
CERTIFICATE OF CORRECTION

PATENT NO. : 4,318,201
DATED : March 9, 1982
INVENTOR(S) : Gerald L. Rogers et al It is certified that error appears in the above—identified patent and that said Letters Patent is hereby corrected as shown below:

Column 2, line 45, "substatially" should be "substantially".
Column 4, line 52, "the invention" should be "this invention".

Column 9, line 5, "controlling" should be "oscillating".
Column 9, line 15, "and curved" should be "said curved".

Signed and Sealed this

Fourteenth Day of September 1982

[SEAL]

Attest:

GERALD J. MOSSINGHOFF

Attesting Officer   Commissioner of Patents and Trademarks